United States Patent
Ellingson

(10) Patent No.: US 7,240,363 B1
(45) Date of Patent: Jul. 3, 2007

(54) SYSTEM AND METHOD FOR THWARTING IDENTITY THEFT AND OTHER IDENTITY MISREPRESENTATIONS

(76) Inventor: Robert E. Ellingson, R.R. 1 Box 69, Sisseton, SD (US) 57262

( * ) Notice: Subject to any disclaimer, the term of this patent is extended or adjusted under 35 U.S.C. 154(b) by 690 days.

(21) Appl. No.: 09/679,916

(22) Filed: Oct. 5, 2000

Related U.S. Application Data

(60) Provisional application No. 60/157,889, filed on Oct. 6, 1999.

(51) Int. Cl.
*G06F 7/04* (2006.01)
*H04K 1/00* (2006.01)

(52) U.S. Cl. .................. 726/5; 726/7; 726/21; 705/64; 705/72; 705/75; 705/76

(58) Field of Classification Search ................ 713/200, 713/201
See application file for complete search history.

(56) References Cited

U.S. PATENT DOCUMENTS

| | | | |
|---|---|---|---|
| 3,985,998 A | 10/1976 | Crafton | |
| 4,013,894 A | 3/1977 | Foote et al. | |
| 4,025,759 A | 5/1977 | Scheffel | |
| 4,109,238 A | 8/1978 | Creekmore | |
| 4,123,747 A | 10/1978 | Lancto et al. | |
| 4,186,871 A | 2/1980 | Anderson et al. | |
| 4,472,626 A | 9/1984 | Frid | |
| 4,601,011 A | 7/1986 | Grynberg | |
| 4,630,201 A | 12/1986 | White | |
| 4,933,969 A | 6/1990 | Marshall et al. | |
| 4,967,366 A * | 10/1990 | Kaehler ....................... | 700/237 |
| 4,998,279 A | 3/1991 | Weiss | |
| 5,019,942 A | 5/1991 | Clemens | |
| 5,097,505 A | 3/1992 | Weiss | |
| 5,103,221 A | 4/1992 | Memmola | |
| 5,131,038 A | 7/1992 | Puhl et al. | |
| 5,144,667 A | 9/1992 | Pogue, Jr. et al. | |
| 5,224,173 A * | 6/1993 | Kuhns et al. ................ | 382/116 |
| 5,283,829 A | 2/1994 | Anderson | |

(Continued)

FOREIGN PATENT DOCUMENTS

| | | | |
|---|---|---|---|
| WO | WO97/04394 A1 * | 2/1997 | |
| WO | WO99/56520 A2 * | 11/1999 | |

OTHER PUBLICATIONS

Wahab et al, Biometrics Electronic Purse, 1999, IEEE, pp. 958-961.*

(Continued)

*Primary Examiner*—Christopher Revak
*Assistant Examiner*—Aravind K Moorthy
(74) *Attorney, Agent, or Firm*—Merchant & Gould P.C.

(57) ABSTRACT

Registered users including businesses attach a one-time-use identity verifier to as many financial and other transactions as they choose to protect themselves from identity thieves. They may also attach a security message to any identity verifier to ensure that a thief cannot steal a registered user's check from a mailbox and use the unused identity verifier. By using one list for all of a person's transactions, applications for new credit by identity thieves are also prevented. All of this is made possible by allowing the identity verifiers to be approved nonsequentially.

22 Claims, 10 Drawing Sheets

U.S. PATENT DOCUMENTS

| | | | |
|---|---|---|---|
| 5,285,200 A | | 2/1994 | Kuriyama |
| 5,321,751 A | | 6/1994 | Ray et al. |
| 5,337,358 A | | 8/1994 | Axelrod et al. |
| 5,367,572 A | | 11/1994 | Weiss |
| 5,524,072 A | * | 6/1996 | Labaton et al. ............... 705/72 |
| 5,534,855 A | * | 7/1996 | Shockley et al. .......... 340/5.52 |
| 5,553,155 A | * | 9/1996 | Kuhns et al. ............... 382/115 |
| 5,630,201 A | | 5/1997 | Suzuki et al. |
| 5,638,444 A | | 6/1997 | Chou et al. |
| 5,661,807 A | | 8/1997 | Guski et al. |
| 5,680,131 A | | 10/1997 | Utz |
| 5,721,779 A | | 2/1998 | Funk |
| 5,754,653 A | | 5/1998 | Canfield |
| 5,770,844 A | * | 6/1998 | Henn ......................... 235/380 |
| 5,812,764 A | * | 9/1998 | Heinz, Sr. ................... 713/202 |
| 5,864,623 A | | 1/1999 | Messina et al. |
| 5,864,829 A | | 1/1999 | Tago |
| 5,883,810 A | | 3/1999 | Franklin et al. |
| 5,890,140 A | * | 3/1999 | Clark et al. ................... 705/35 |
| 5,955,961 A | | 9/1999 | Wallerstein |
| 5,956,699 A | | 9/1999 | Wong et al. |
| 5,971,272 A | | 10/1999 | Hsiao |
| 5,991,750 A | | 11/1999 | Watson |
| 6,011,858 A | | 1/2000 | Stock et al. |
| 6,014,650 A | | 1/2000 | Zampese |
| 6,016,480 A | | 1/2000 | Houvener et al. |
| 6,040,783 A | | 3/2000 | Houvener et al. |
| 6,044,362 A | | 3/2000 | Neely |
| 6,047,268 A | * | 4/2000 | Bartoli et al. ................ 705/35 |
| 6,047,270 A | | 4/2000 | Joao et al. |
| 6,047,281 A | * | 4/2000 | Wilson et al. ................. 707/3 |
| 6,052,675 A | | 4/2000 | Checchio |
| 6,070,141 A | * | 5/2000 | Houvener et al. ............. 705/1 |
| 6,081,793 A | * | 6/2000 | Challener et al. ............. 705/50 |
| 6,092,196 A | * | 7/2000 | Reiche ....................... 713/200 |
| 6,095,413 A | | 8/2000 | Tetro et al. |
| 6,105,007 A | | 8/2000 | Norris |
| 6,105,010 A | | 8/2000 | Musgrave |
| 6,105,011 A | | 8/2000 | Morrison, Jr. |
| 6,112,078 A | | 8/2000 | Sormunen et al. |
| 6,122,624 A | | 9/2000 | Tetro et al. |
| 6,154,879 A | * | 11/2000 | Pare et al. ..................... 705/35 |
| 6,236,972 B1 | * | 5/2001 | Shkedy .......................... 705/1 |
| 6,636,833 B1 | * | 10/2003 | Flitcroft et al. ................ 705/1 |
| 6,796,494 B1 | * | 9/2004 | Gonzalo ..................... 235/380 |
| 6,908,030 B2 | * | 6/2005 | Rajasekaran et al. ....... 235/379 |
| 6,957,185 B1 | * | 10/2005 | Labaton ...................... 704/500 |
| 2001/0037451 A1 | * | 11/2001 | Bhagavatula et al. ....... 713/155 |
| 2001/0047281 A1 | * | 11/2001 | Keresman et al. ............. 705/2 |
| 2002/0052214 A1 | * | 5/2002 | Maggenti et al. ........... 455/517 |

OTHER PUBLICATIONS

Sanchez-Reillo, Raul, Smart Card Information and Operations using Biometrics, 2001, IEEE, pp. 3-6.*

Anonymous, CIC Annouces SignatureOne, Jan. 2004, PR Newswire, pp. 1-3.*

Kroenke, D. et al., "Secondary-key Representations", *Database Processing and Fundamentals, Design, Implementation*, 3rd Edition, Science Research Assoc., Inc., (an IBM Company), Chicago, pp. 657-664 (1988, 1983, 1977).

Tanenbaum, A., "Security", *Operating Systems: Design and Implementation*, Prentice-Hall, Inc., (a Division of Simon & Schuster), Englewood Cliffs, NJ, pp. 285-289 (1987).

* cited by examiner

FIGURE 6

| bank teller | retailer | tavern | phone company | purchaser | card dealer | other | 06432178 Public Information and Recipient |
|---|---|---|---|---|---|---|---|
| x |   |   | x | x |   |   | Name: Wayne Stanley |
|   | x | x |   |   |   |   | Age: 27* |
|   |   |   | x | x | x |   | Date of Birth: 29 March 1973 |
| x |   |   |   |   |   |   | Home Phone: (687) 284-6894 |
|   |   |   |   |   |   |   | Work Phone: (312) 684-2641 |
| x |   |   | x |   |   |   | e-mail: alex@west.com |
| x |   |   | x |   |   |   | Address: 6824 Fremont Boulevard |
| x |   |   | x |   |   |   | City: Fresno |
| x |   |   | x |   |   |   | State: CA |
| x |   |   |   |   |   |   | Zip: 98201-3641 |
| x |   |   |   |   |   |   | SSN: |
|   |   |   |   |   |   |   | Middle Name: |
|   |   |   |   |   |   |   |   | x = supply this information to recipient
\* = calculated by database management system

FIGURE 7

| Numerical Identifier Type | Numercial Identifier | (optional) Uniquness Suffix | Pointer to User's Record |
|---|---|---|---|
| 0 | 503629481 | | 6043289 |
| 0 | 503668821 | | 6059741 |
| 0 | | | |
| 0 | | | |
| 1 | 44 503679418 | | 6079633 |
| 1 | | | |
| 1 | | | |
| 1 | | | |
| 2 | 5426 413268914281 | 3 | 6059741 |
| 2 | | | |
| 2 | | | |
| 2 | | | |

FIGURE 8

| Relative Record Number | List of Transactions That Require IDV | Table of IDV's | Public Information and Recipient |
|---|---|---|---|
| 6043289 | 96804294 | 34682141 | 06432178 |
| 6043290 | 66432174 | 39862843 | 05224101 |
| 6043291 | 88365261 | 46891300 | 07891302 |

FIGURE 9

| 96804294 ||
|---|---|
| List of Transactions That Require IDV ||
| All Financial Transactions Except: ||
| Bank Routing Number XXXX Checking Account Number XXXX Under $50 and ATM Card | Calling Card Number (402) 688-2136 4280 |

Table of IDV's

| IDV | Verification Trans. ID | Time, Date | Requesting Party | Optional Info. |
|---|---|---|---|---|
| 68231 | 2468 | 63284987 | 605886221478 | |
| 43801 | 1890 | | | Check to AYB for $50+ |
| 69210 | 6336 | 662891478 | 2246228911876 | Credit Card to BNG for $800+ |
| 00010 | 9810 | | | |

SYSTEM AND METHOD FOR THWARTING IDENTITY THEFT AND OTHER IDENTITY MISREPRESENTATIONS

RELATED APPLICATIONS

This application claims the benefit of provisional application, U.S. Ser. No. 60/157,889 filed on Oct. 6, 1999, entitled "Identity Verifier", by Robert E. Ellingson.

TECHNICAL FIELD

The present invention relates to identity verification. More particularly, the present invention relates to a system and method for verifying the identity of a registered user.

BACKGROUND OF THE INVENTION

Identity crimes are a significant problem in society. Identity crimes include identity theft, identity fraud, identity cloaking, check counterfeiting, and other crimes. Some specific examples of identity crimes include credit card theft, check theft, medicare fraud, ATM card theft, and minors using fake identifications to obtain admittance to a bar or adult-only Internet sites. Many other examples of identity crimes abound around us. Despite new laws designed to combat identity crimes, it is still easy for a criminal to take out loans in someone else's name, to run up enormous credit card debts and tap into bank accounts.

Numerical identifiers such as credit card numbers and social security numbers were originally designed to serve as means for verifying a person's identity. However, these numerical identifiers are easily obtained by a criminal. For example, a credit card receipt can be easily removed from a waste basket to obtain the credit card number. Social security numbers are often requested to be entered on all kinds of forms. Any person later coming into contact with such forms can easily obtain the social security number.

Various technologies have been devised in attempts to solve the problem of identity crimes. For example, biometrics such as fingerprint recognition equipment can be used to determine or confirm a person's identity by scanning the person's fingerprint and comparing it to an earlier stored fingerprint of the person. Retinal scans or DNA analysis can also be used to identify a person. Such equipment is very expensive to replicate on a large scale.

Banks often use a personal identification number (PIN) to verify the identity of a person. A bank customer is required to enter his or her PIN prior to withdrawing cash from his or her account. This PIN is a static number (i.e., it does not change for each transaction) and it can be reused over and over again. Therefore, there is a risk that a criminal can obtain a PIN number from a previous transaction and simply reuse it to perpetrate a crime. In other words a PIN number must be kept hidden even after it is used. Furthermore, PIN's are specific to a single account and are not used universally to all types of transactions in a person's life.

Another example of a situation in which verifying a person's identity is important is in preventing children from entering adult-only establishments. For example, bars and nightclubs often need to determine the age of a patron to ensure that the patron is not a minor. Typically these establishments use a patron's driver's license to ascertain their age. However, minors often obtain fraudulent drivers licenses by inserting their photograph into a stolen or otherwise obtained driver's license of an adult. Similar methods may be used to falsely assert an older age for purchasing cigarettes or alcohol. Use of fingerprint or other recognition equipment is typically too expensive for these establishments and therefore enforcement of the laws is difficult.

The recent advances in commercial transactions over the Internet have also created an interest by purchasers in verifying the identity of the entity they are doing business with. Before providing a credit card number to purchase an item or transact some form of business, the person desires to gain some assurance that the entity with whom they are transacting the business is reputable.

SUMMARY OF THE INVENTION

An identity verification method is provided. The identity verification method includes the steps of obtaining a list of at least two identity verifiers and linking the identity verifiers to at least one numerical identifier wherein the numerical identifier is associated with a registered user. The method also includes the steps of receiving a numerical identifier and an identity verifier from a requesting party and determining whether the received identity verifier is linked to the received numerical identifier. The method includes communicating information to the requesting party indicating whether the received identity verifier is linked to the received numerical identifier.

In accordance with another aspect of the invention, a method of determining whether an identity verifier is required to be submitted in a particular transaction is also provided.

In accordance with another aspect of the invention, an identity verification system is provided. The system includes a database, an input module, a communications module and a processor module.

In accordance with another aspect of the invention, a remote terminal for communicating with an identity verification system is provided. The remote terminal includes an input module and a communications module.

In accordance with another aspect of the invention, a computer program storage medium readable by a computing system and encoding a computer program of instructions for executing a computer process is provided. The computer process stores at least two identity verifiers in a database. The computer process also stores at least one numerical identifier associated in a database wherein the numerical identifier is linked to the at least two identity verifiers. The computer process receives a numerical identifier and an identity verifier. The computer process compares the received numerical identifier and the received identity verifier to the stored numerical identifiers and identity verifiers to determine whether the received identity verifier is linked to the received numerical identifier. The computer process also communicates information indicating whether the received identity verifier is linked to the received numerical identifier.

BRIEF DESCRIPTION OF THE DRAWINGS

FIG. 6 illustrates one portion of a registered users record according to one preferred embodiment of the present invention.

FIG. 7 is an exemplary index for locating a registered user's record based on a numerical identifier in accordance with the principles of the present invention.

FIG. 8 is an exemplary table of records and associated pointers in accordance with the principles of the present invention.

FIG. 9 is an exemplary table of transactions associated with pointer number 96804294 of the first record in FIG. 8 in accordance with the principles of the present invention.

FIG. 10 is an exemplary table of identity verifiers associated with pointer 34682141 of the first record in FIG. 8 in accordance with the principles of the present invention.

DETAILED DESCRIPTION OF THE INVENTION

The methodology of the present invention can be implemented in many different ways. These different ways do not require use of a computer system. However, in one preferred embodiment a computer system is used to implement the methodology of the present invention. Therefore, this detailed description begins with a description of one embodiment of a computer system implementation of the invention.

Figure 1:
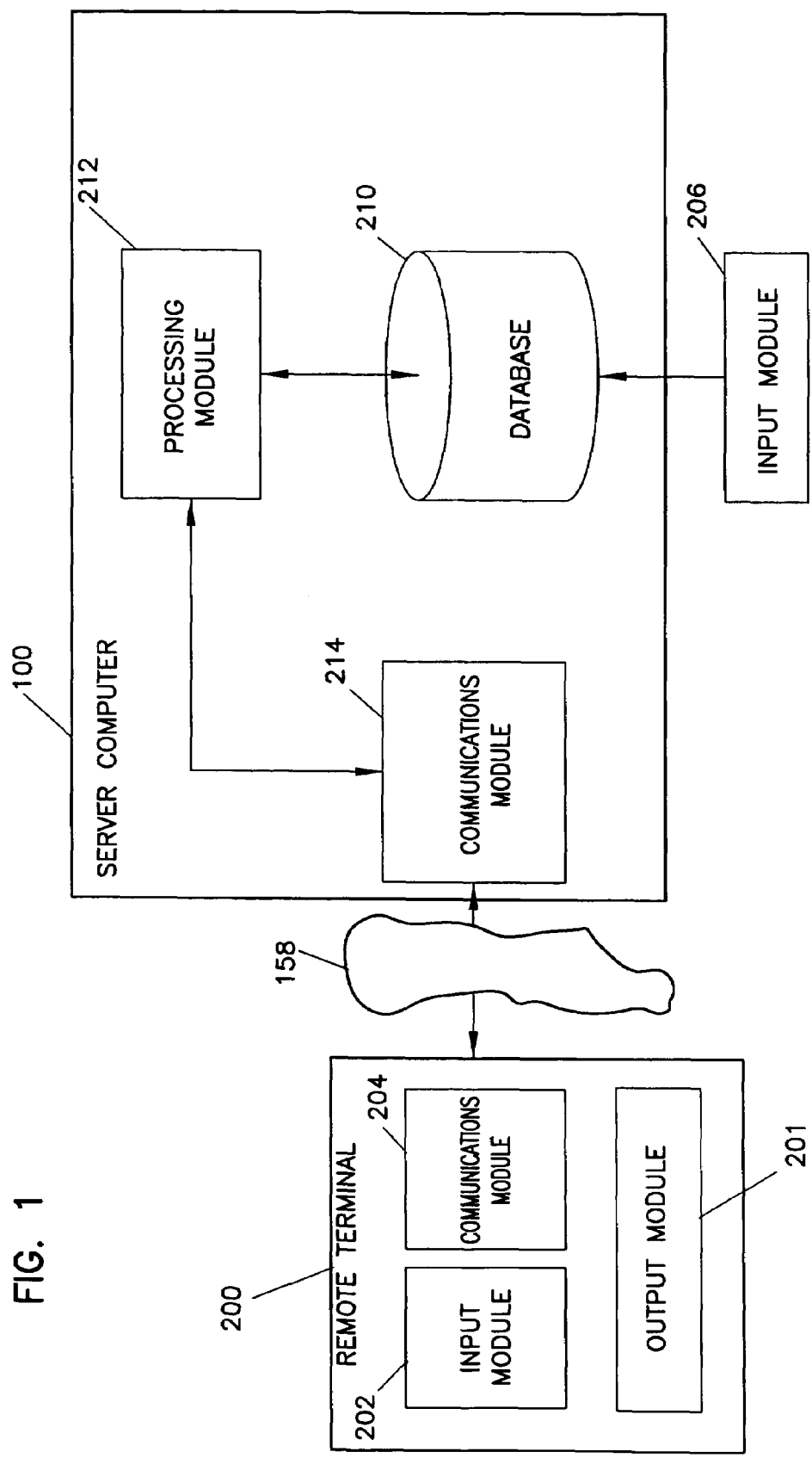
FIG. 1 illustrates one embodiment of an identity verification system in accordance with the principles of the present invention.

FIG. 1 illustrates one embodiment of a computer system in accordance with the present invention. The remote terminal 200 communicates through a communications network 158 with a server computer 100. An input module 206 is connected to the server computer 100.

A remote terminal is a communications device that is capable of sending and receiving information through a communications network. Remote terminal 200 includes an output module 201, an input module 202, and a communications module 204.

Figure 2:
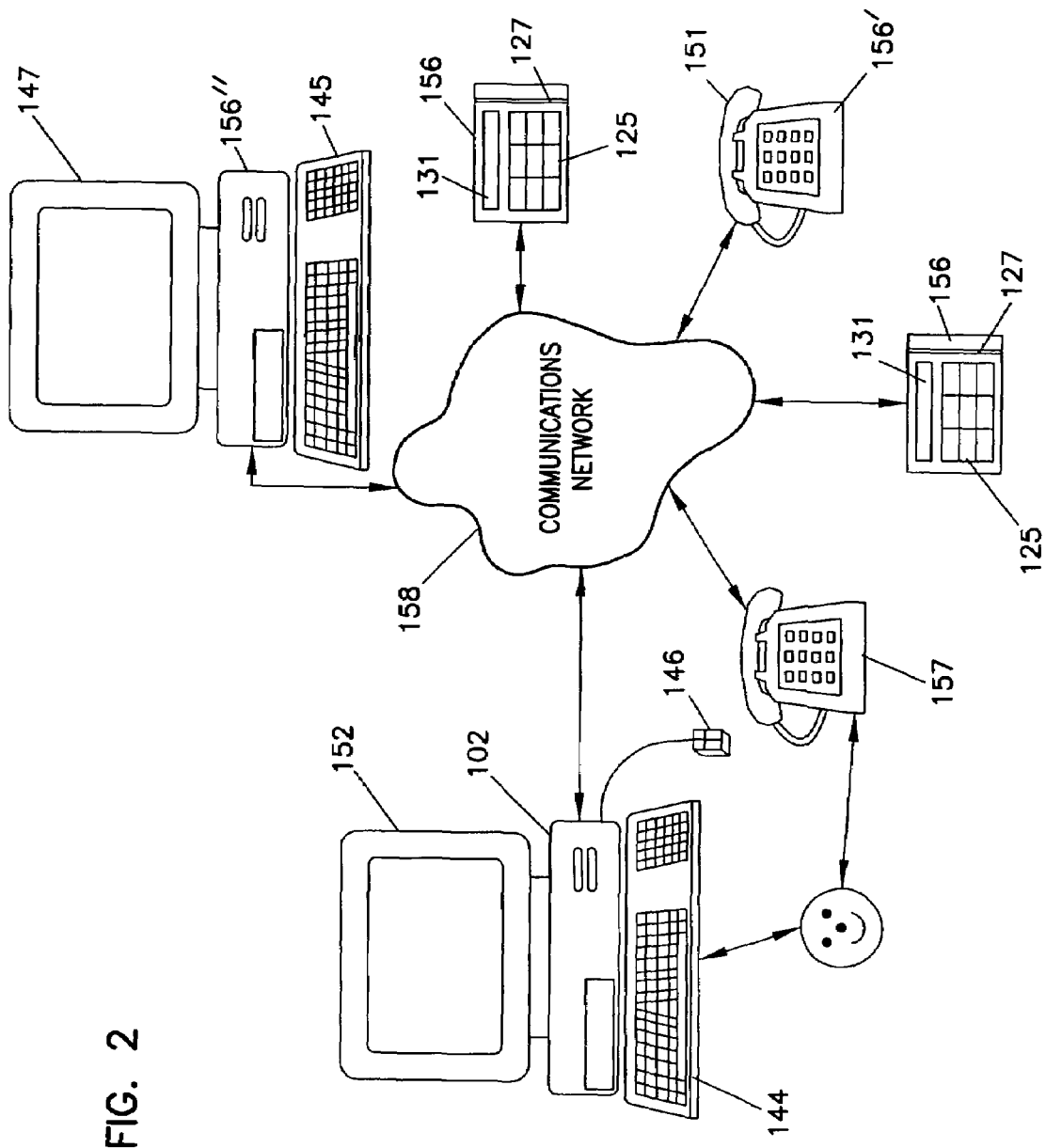
FIG. 2 illustrates one embodiment of an identity verification system in accordance with the principles of the present invention.

Some preferred embodiments of remote terminal 200 are illustrated in FIG. 2. One preferred embodiment of remote terminal 200 is a magnetic card swipe and keypad device 156 having a keypad 125, magnetic card reader 127 and output display 131. Another preferred embodiment of remote terminal 200 is a telephone 156'. Alternatively, remote terminal 200 could be a computer 156" including keyboard 145 and monitor 147.

Returning to FIG. 1, input module 202 is capable of inputting information into the remote terminal 200. In a preferred embodiment shown in FIG. 2, input module 202 is a keypad 125, a card swipe reader 127, or both. In another preferred embodiment, the input module 202 is a keyboard 145 connected to a computer 156". In another preferred embodiment, the input module is a receiver 151 on telephone 156'.

Communications module 204 of the remote terminal 200 is capable of receiving and transmitting information to and from communications network 158. In a preferred embodiment, communications module 204 is a modem or other communications hardware as typically used on a credit card reading device. Alternatively, the communications module 204 can simply be the components of a telephone that allow communications over a telephone line.

In a preferred embodiment of the invention, output module 201 is a display screen 131. In another preferred embodiment, the output module 201 is a monitor 147. In another preferred embodiment, the output module 201 is a transmitter in a telephone.

Computer 100 includes a processing module 212 connected to a database 210 and also connected to a communications module 214. It is important to note that even though the database 210 is shown as being in the computer 100, the memory in which the database resides could alternatively be offsite from the computer 100.

A processing module is a module capable of executing a series of instructions in a program and it includes a central processing unit (cpu) such as a microprocessor.

FIG. 2 illustrates a possible organization for a computing system for implementing an embodiment of the present invention. The computing system includes a plurality of devices connected together using communications network 158.

The devices of the computing system include remote terminals that may include card swipe and keypad device 156, telephone 156' and client computer 156". Other types of remote terminals may be utilized. The computing system also includes server computer 102 having monitor 152, keyboard 144 and mouse input device 146. The computer 102 in this embodiment is connected to the communications network 158 for communicating with the remote terminals 156, 156' and 156".

Remote terminals 156 include a keypad 125 for inputting information, and a magnetic card swipe reader 127 also for inputting information.

The server computer 102 receives service requests from the remote terminals 156, 156' and/or 156", as will be described below, and generates appropriate responses.

The communications network 158 of a preferred embodiment is a wide area network (WAN). In one possible embodiment of the invention, the WAN may be the Internet in which user computers 156" are connected using a typical dial-up connection through an internet service provider (ISP).

In another preferred embodiment the communications network 158 may be a local area network (LAN).

In yet another preferred embodiment, the communications network 158 could be simply a telephone line connecting telephone 156' to telephone 157. In this preferred embodiment, the telephone 157 is situated near an input device such as keyboard 144 and mouse 146 so that a person can interface between voice communications via telephone 157 and the computer 102 to provide the necessary services to the person requesting such services from telephone 156'.

In another embodiment utilizing a telephone 156' as a remote terminal, an automatic telephone communication and messaging system may be used to provide automated communications between the person at telephone 156' and the computer 102 without intervention of another person at a telephone 157.

Figure 3:
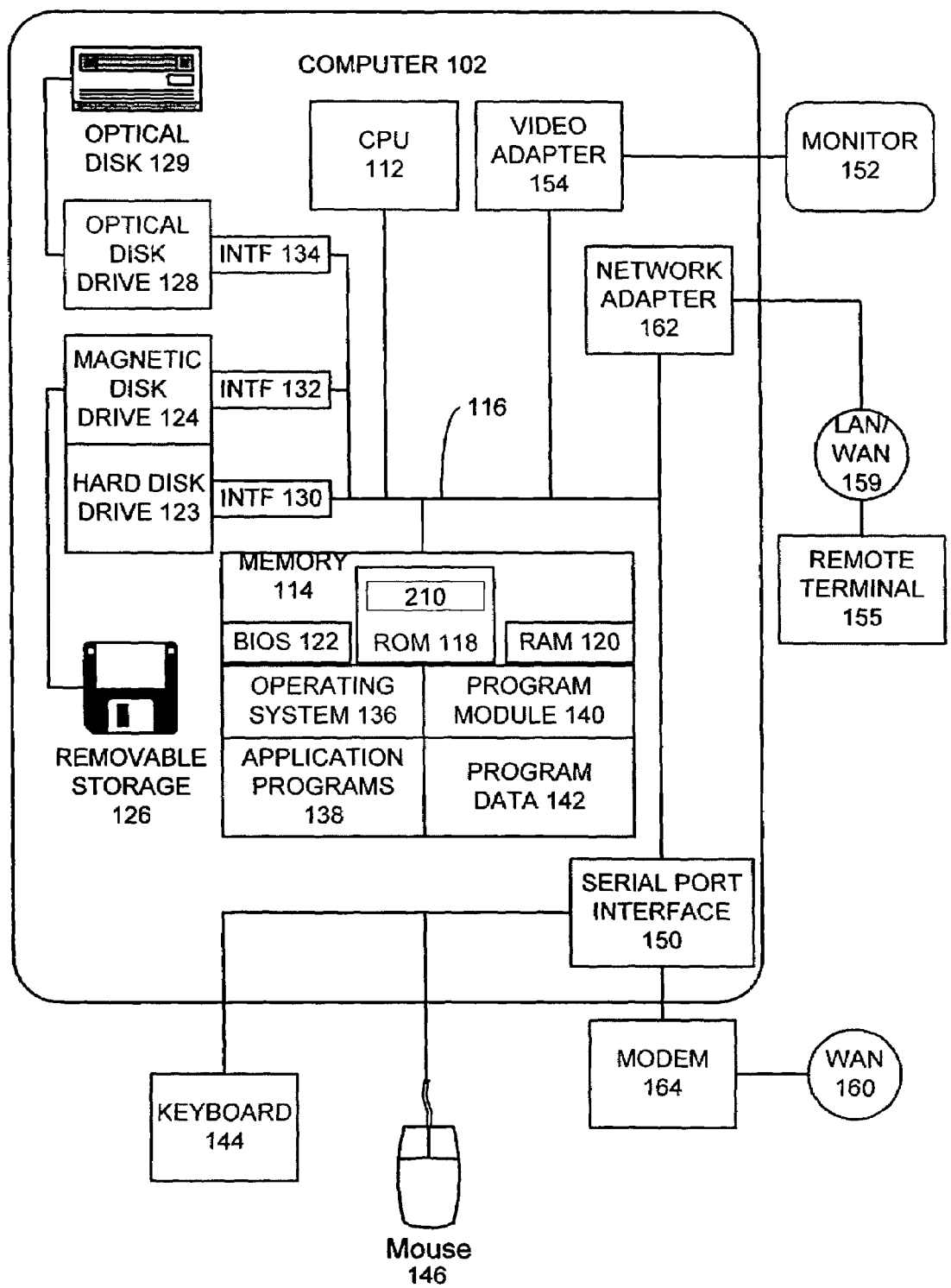
FIG. 3 illustrates one embodiment of a computer system in accordance with the principles of the present invention.

FIG. 3 illustrates computer 102 according to one embodiment of the present invention. An exemplary computing system for an embodiment of the invention includes a general purpose computing device in the form of a conventional computer system 102 including a processor unit 112, a system memory 114, and a system bus 116 that couples various system components including the system memory 114 to the processor unit 112. The system bus 116 may be any of several types of bus structures including a memory bus or memory controller, a peripheral bus and a local bus using any of a variety of bus architectures. The system memory includes read only memory (ROM) 118 and random access memory (RAM) 120. A basic input/output system 122 (BIOS), which contains basic routines that help transfer information between elements within the computer system 102, is stored in ROM 118.

The computer system 102 further includes a hard disk drive 123 for reading from and writing to a hard disk, a magnetic disk drive 124 for reading from or writing to a removable magnetic disk 126, and an optical disk drive 128 for reading from or writing to a removable optical disk 129 such as a CD ROM, DVD, or other optical media. The hard disk drive 123, magnetic disk drive 124, and optical disk drive 128 are connected to the system bus 116 by a hard disk drive interface 130, a magnetic disk drive interface 132, and an optical drive interface 134, respectively. The drives and their associated computer-readable media provide nonvolatile storage of computer readable instructions, data structures, programs, and other data for the computer system 102.

Although the exemplary environment described herein employs a hard disk, a removable magnetic disk 126, and a removable optical disk 129, other types of computer-readable media capable of storing data can be used in the exemplary system. Examples of these other types of computer-readable mediums that can be used in the exemplary operating environment include magnetic cassettes, flash memory cards, digital video disks, Bernoulli cartridges, random access memories (RAMs), and read only memories (ROMs).

A number of program modules may be stored on the hard disk, magnetic disk 126, optical disk 129, ROM 118 or RAM 120, including an operating system 136, one or more application programs 138, other program modules 140, such as a database management system, and program data 142. A user may enter commands and information into the computer system 102, through input devices such as a keyboard 144 and mouse 146 or other pointing device. Examples of other input devices may include a microphone, joystick, game pad, satellite dish, and scanner. These and other input devices are often connected to the processing unit 112 through a serial port interface 150 that is coupled to the system bus 116. Nevertheless, these input devices also may be connected by other interfaces, such as a parallel port, game port, or a universal serial bus (USB). A monitor 152 or other type of display device is also connected to the system bus 116 via an interface, such as a video adapter 154. In addition to the monitor 152, computer systems typically include other peripheral output devices (not shown), such as speakers and printers.

As discussed above with respect to FIG. 1, a server computer 100, communicates through a communications network 158 with remote terminals 200. In the embodiment shown in FIG. 3, the network connections include a local area network (LAN) 159 and a wide area network (WAN) 160. Such networking environments are commonplace in offices, enterprise-wide computer networks, intranets, and the Internet.

The computer system 102, is logically connected to one or more remote terminals, such as a remote terminal 155. The remote terminal 155 may be a computer system, a server, a router, a network PC, a peer device or other common network node, and as discussed above, may include a keypad and card swipe device 156 or a computer system 156".

When used in a LAN networking environment, the computer system 102 is connected to the communications network 158 through a network interface or adapter 162. When used in a WAN networking environment, the computer system 102 typically includes a modem 164 or other means for establishing communications over the wide area network 160, such as the Internet. The modem 164, which may be internal or external, is connected to the system bus 116 via the serial port interface 150. In a networked environment, program modules depicted relative to the computer system 102, or portions thereof, may be stored in the remote memory storage device. It will be appreciated that the network connections shown are exemplary, and other means of establishing a communications link between the computer 102 and the remote terminals 155 may be used.

A computing device, such as computer system 102 typically includes at least some form of computer-readable media. Computer readable media can be any available media that can be accessed by the computer system 102. By way of example, and not limitation, computer-readable media might comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by the computer system 102.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media. Computer-readable media may also be referred to as computer program product.

The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

A preferred method of verifying the identity of a registered user in accordance with the principles of this invention will now be explained with reference to the drawing figures.

A person or entity that applies for and is accepted into the identity verification method or system of the invention is referred to as a registered user. A registered user could be any individual who wishes to safeguard their identity or allow others to verify certain information about the registered user. A registered user could also be an entity such as an online retailer who utilizes the identity verification method or system of the invention to allow customers to obtain information about the retailer or to verify the identity of the retailer.

The identity verification process may be used for checks (mailed, in person, over the Internet, over the telephone), credit card transactions (mailed, in person, over the Internet, over the telephone), loan applications, opening bank or credit card accounts, preventing phone slamming or cramming, carding patrons in bars, ensuring that adult-only sites on the Internet are not visited by children, preventing Medicare fraud, authorizing automatic bill payments by check or credit card, and verification of identities without photographs.

The entity or entities implementing or running the identity verification method or system of the invention must take a preliminary step to set up a registered user. This step involves performing a background investigation of the potential registered user to make sure that the potential registered user is not attempting to use the identity verification method to further perpetrate a crime. This investigation should focus on ensuring that the identity of the potential registered user is as presented by the potential registered user.

It is envisioned that the entity managing the identity verification system would have agents located throughout the market place (e.g., at banks throughout the country) to implement the registration of a user.

Figure 4A:
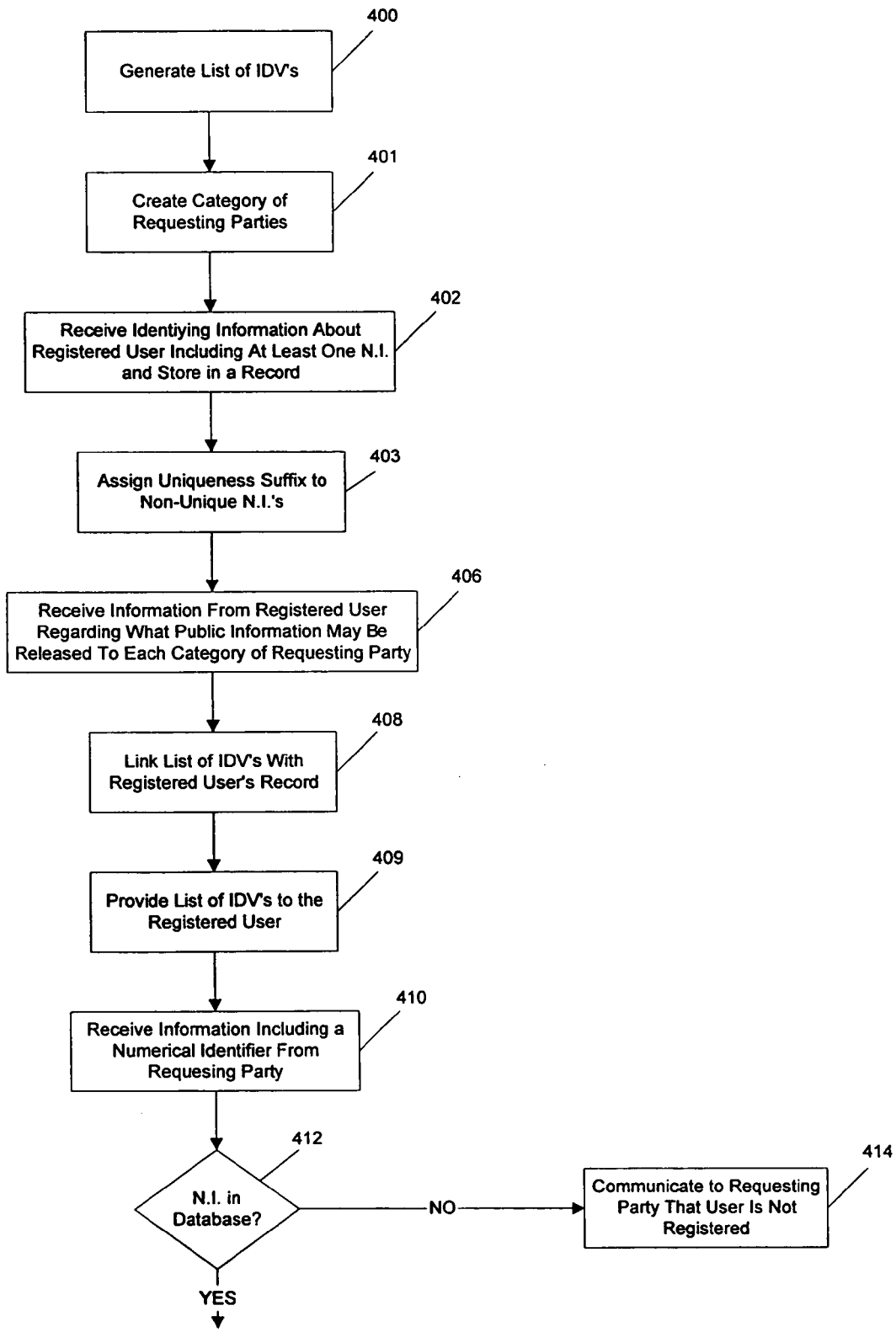
FIGS. 4a–4c are a flow chart diagram of one embodiment of a method of verifying the identity of a registered user in accordance with the principles of the present invention.

Turning now to FIG. 4a, the generate operation 400 involves obtaining or generating a list of identity verifiers or identification verifiers (idv's). An identification verifier is any n-digit string of random characters, symbols or numbers. For example an identification verifier could be a five-digit number like 83604 or 01781. Alternatively, an identification verifier could be a six-digit combination of characters, symbols and numbers such as B#1?C %.

The number of characters or digits in an idv depends on the number of transactions the particular registered user will be engaged in. For example, a user with a small number of transactions may have a list of 200 idv's each of which is 5 digits long such as any numbers between 00000 and 99999. Alternatively, a government agency which writes many checks may have 200,000,000 idv's, each of which is 11 digits long such as numbers between 00000000000 and 99999999999.

Idv's can be obtained or generated in many different ways. It is important to generate the idv's in such a way as to minimize the possibility of reverse engineering lists of idv's. Reverse engineering of idv's would, for example, allow someone to determine the nature of the next idv on a list of idv's by knowing earlier idv's and understanding the algorithm used to generate the idv's.

A list of random numbers that is comprised of mixed true and pseudo-random numbers cannot be reverse engineered. A pseudo random number is created by a computer program called a random number generator. It is not technically random because running the program with the same initial seed number will always produce the same list of random numbers. Generating such a table is even easier if the numbers do not need to be equally distributed, which is the case for this invention. If several idv lists are being created at the same time, and several methods of generating numbers are interspersed, reverse engineering of the numbers in the lists becomes impossible.

Figure 5:
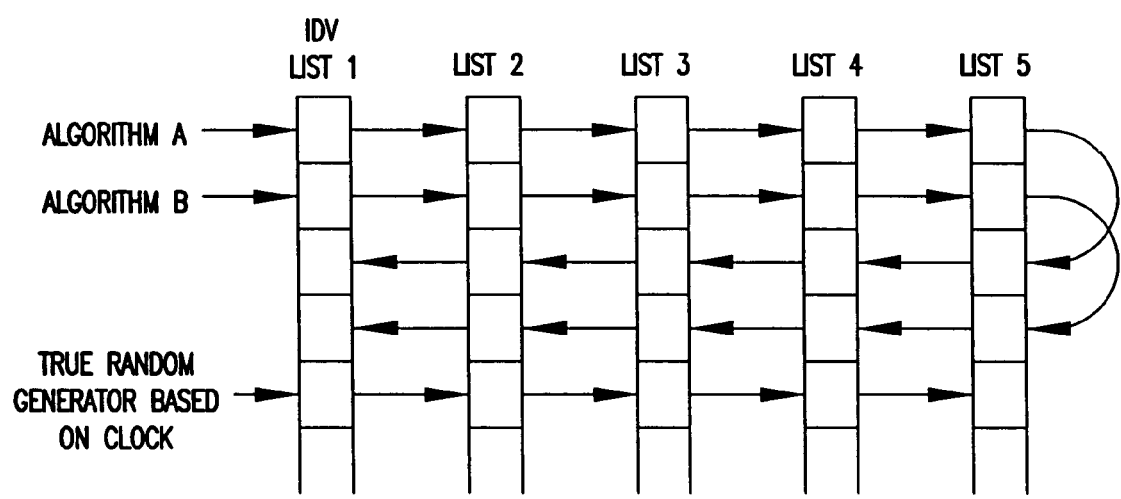
FIG. 5 illustrates one preferred method of creating lists of identification verifiers in accordance with the principles of the present invention.

FIG. 5 illustrates a preferred embodiment of the generate operation 400. Two random number generating algorithms A and B as well as a true random number generating method based on a clock time are used in an interspersing manner to create lists of idv's that cannot be reverse engineered. As can be seen in FIG. 5, algorithm A generates and places the first idv in each of five idv lists beginning with list 1 and ending with list 5. Algorithm B generates and places the second idv in each of the five idv lists beginning with list 1 and ending with list 5. Algorithm A then generates and places the third idv's in the five lists beginning with list 5 and ending with list 1. Algorithm B then generates and places the fourth idv's in the five lists beginning with the list 5 and ending with list 1. Then the true random generator based on clock time generates and places the fifth idv's in the five lists beginning with list 1 and ending with list 5. This process can be repeated as many times as is necessary. Alternatively the order of algorithms can be altered instead of repeated. As can be seen there are a large number of variations of the above process of creating or generating a list of idv's and this is but one example.

In a preferred embodiment of the methodology of the invention, the idv list is massaged to eliminate the problem of any random number repeating itself too soon in the list. In other words, a number or string of characters used for an idv may be repeated as an idv later in time. However, a "relevant range" must be defined to make sure that the same number or string of characters is not used too close in a list to each other. For example, a relevant range could be defined as 60 days. This means the method for generating idv's must ensure that in a 60-day period, assuming an average number of transactions, no two idv's will be the same. Modifying the size of the replenishment list (later list) can enforce this constraint.

It is also within the scope of the methodology of this invention for the idv lists to be obtained from an entity other than the entity that owns or runs the identity verification system. For example, the idv lists could be generated off site from the server computer 100 and downloaded or otherwise inputted into the database 210.

Once the idv list is generated, identical copies of it are given to the registered user and attached to the registered user's record by the entity that runs the identity verification system. The registered user can store the list of idv's on a password-protected electronic calculator-like memory device which functions as a storage and access device for the list. Alternatively, the list can be stored on paper.

The list of idv's does not have to be used sequentially by the registered user. However, only idv's within the relevant range should be used. This characteristic permits a user to use the system without concern about absolute order of use of the list of idv's. For example, the user can write and mail a check that includes an idv that will be used after another transaction performed later in the day.

Note also that if a registered user loses its list of idv's, a new list would be generated. This new list would contain entirely new idv's not on the lost list.

The create categories operation 401 sets up categories of requesting parties so that the registered user can differentiate the information to be supplied to each category. Some example categories are: bank, retailer, tavern, phone company, purchaser, car dealer, etc. These categories may be preset prior to registration of a user or they may be created by the user at the time of registration.

The receiving public information operation 402 involves obtaining certain information about a registered user or prospective registered user. In a preferred embodiment of the invention, the information is stored in a record associated with the registered user, the record residing in the database 210.

In a preferred embodiment the registered user decides which information will be supplied to the record. Examples of information that could be provided are age, name, middle name, phone numbers, date of birth, social security number, drivers license number, credit card numbers, and banking account numbers. In a preferred embodiment at least one existing numerical identifier is received into the record. It is noted that this information including changes in numerical identifiers should be updated from fine to time as may be necessary.

A numerical identifier is any code, number or symbol typically associated with a particular person but that could be associated with more than one person. Examples of numerical identifiers are social security number, drivers license number, credit card numbers, banking account numbers (as long as the routing number is included), phone numbers, etc.

Some of these numerical identifiers are shared between two or more people. For example, a couple sharing a checking account results in both individuals being associated with the same numerical identifier (the checking account number). These shared numerical identifiers can be made unique to a particular person by assigning a suffix to the shared numerical identifier. For example, the husband in the above example could be assigned suffix 1 such as a number 01, and the wife could be assigned suffix 2, such as number 02. By including the suffix with the original numerical identifier, a made-unique numerical identifier is created.

Further information that is preferably obtained in the receiving public information operation 402 includes information about which transactions will not be covered by the identity verifier process. For example, a registered user may decide that checks under $20 from a specific checking account will not require an idv. As another example, a registered user may indicate that use of a particular credit card will not require an idv while all other transactions will require an idv.

Assigning suffix operation 403 determines whether a uniqueness suffix is required, and, if so, assigns a suffix. This six may be stored in the uniqueness suffix column as shown in FIG. 7.

A requesting party is any party attempting to verify the identity of a person through the identity verification process. Examples of requesting parties are banks, retailers, credit card companies, nightclubs, online retailers, online shoppers, etc.

The receive information operation 406 involves obtaining instructions from the registered user indicating which public information (e.g., age, name, middle name, home phone number, work phone number, other phone numbers, date of birth, social security number, driver license number) to make available to which categories of requesting parties.

FIG. 6 is an example partial record stored in the database 210 and associated with a particular registered user. The right-most column of the record in FIG. 6 contains personal information about the registered user. The left columns each represent a particular category of requesting party such as bank, retailer, tavern, phone company, purchaser, car dealer, etc. There is also a miscellaneous catchall column entitled "other". For each of these left columns, a check mark is placed in the rows for which the indicated information can be released. So, for example, if the requesting party is a tavern, then the only information that can be provided to the requesting party is the age of the registered user. On the other hand, this particular registered user has indicated in FIG. 6 that if the requesting party is a bank, then the name, work phone, address, city, state, zip, social security number and middle name may be provided to the requesting party.

By indicating which information is to be provided to a particular category of requesting party, the method of invention allows release of information necessary for a particular transaction while protecting all other information about the registered user.

In the interest of privacy, the requesting parties that fit within the categories that allow for the release of larger amounts of information may be required to submit a password or a special idv list to prove that they are truly in such a category. A preferred embodiment of this process would require that any party wishing to obtain such a password to submit themselves to a background investigation to prove the identity of such a requesting party and/or to determine the trustworthiness of such a party. Once such a successful investigation is completed, the requesting party would be provided with a password. Once armed with a password or special idv list, this requesting party could submit the password to the entity running the identity verification process to prove its category and therefore obtain higher levels of information about the registered user.

Linking idv's operation 408 of FIG. 4a links the list of idv's from the generating operation 400 to the registered user's record. This record is preferably stored in a database 210. FIG. 8 illustrates three example rows of entries in a database 210. Each row represents a single registered user's record. The first column is entitled "relative record number" and the numbers in this column are numbers that identify the record. The second column is entitled "list of transactions that require an idv". The second column contains a number or pointer that points to another portion of the record devoted to listing the transactions that the registered user has indicated are to require an idv. For example, the first row of the second column points to the portion of the record illustrated in FIG. 9.

FIG. 9 provides an example record portion for identifying the transactions that require an idv. In this example, all financial transactions require an idv except the items listed in the fourth row.

The third column in FIG. 8 contains a number that points to the record portion that contains the table of idv's. In one preferred embodiment, this pointer is the way in which the list of idv's is linked to the registered user's record. An exemplary table of idv's is illustrated in FIG. 10.

The list of idv's is placed in the first column of the table in FIG. 10. For example, the number "68231" is a five digit idv. The second column contains the corresponding verification transaction identifier that will be explained more fully below.

The third column contains space for storing time and date information about the transaction. This time and date information basically is the time and date of the transaction which can be recorded in many different ways including by the remote terminal or by the computer system or by a human operator of the system who manually enters the time and date.

The fourth column contains space for storing information about the requesting party. This fourth column can contain communication origin information. Communication origin information is some code for identifying the requesting party. For example, the communication origin information could be the phone number, Internet address, fax number, or email address of the requesting party. In a preferred embodiment, this communication origin information is received by the server computer 100 at the time of receipt of the numerical identifier.

The fifth column provides space for storing optional information such as a message about the transaction such as the amount spent and the payment method.

As will be described in more detail below, the message in the 5th column of FIG. 10 is provided as an extra security measure for certain transactions. This message can be entered into the system by the registered user prior to completion of a transaction. Then, when the transaction is completed, another interested party can compare the information in the 5th column with the information received from the transaction. The information in the 5th column may alternatively be stored in the optional database.

An example of a use of the optional database or 5th column message of FIG. 10 is now provided. Suppose a person's checks are being stolen from mailboxes. The idv's on the checks can be used by check counterfeiters. To overcome this, a person can supply pertinent details associated with the idv to the system. For a check, the registered user may send (via Internet or voicemail converted to text via speech recognition software) the idv, the check's recipient, the amount, the date, and even the recipient's address to the optional information portion of the record (e.g., 5th column of FIG. 10) after supplying one of the registered user's unique numerical identifiers and a password. The recipient of a counterfeit check containing a valid identity verifier then will be provided details and, seeing the inconsistency, will be alerted that fraud is being attempted.

The optional database (i.e. the optional 5th column of FIG. 10) may be used to help protect government agencies from check fraud and counterfeiting. For example, the government agency may want to ensure that Medicare checks are cashed only by the person specified and only for the amount specified on the check. In such an example, the optional information associated with the check's idv (the information that would be stored in the 5th column of the record shown in FIG. 10) could state the amount of the check and the recipient's social security number. When the recipient of the government check cashes the check they must submit their own idv. The identity verification process of this invention then uses the recipient's social security number and idv to verify the identity of the recipient before cashing the check.

In the government check example, the idv is present on the face of the check. The check number could also serve as the government's idv for the check. Because the process in this example is utilizing the optional information, the transaction is still secure despite the ability to guess or determine the idv's on the checks.

It is noted that the information in the table of FIG. 10 is saved and archived for legal and audit purposes. The information stored in the table of FIG. 10 can be valuable to track a party's financial or other transactions. Furthermore, such information may be valuable to resolve a legal dispute about a particular transaction. For example, some events, like will signings, will be verified years after an event's date.

Returning to FIG. 8, the fourth column contains a number that points to the public information table of FIG. 6, which was already described above.

FIG. 7 illustrates a list of numerical identifiers that may be preferably stored in database 210. The list of numerical identifiers provides pointers to the record of the associated registered user. In other words, the table of FIG. 7 is an index that allows an inputted numerical identifier to be used to locate the corresponding registered user's record.

The first column of the index of FIG. 7 contains the numerical identifier type. For example a type of "0" could represent social security numbers, a type of "1" could represent drivers license numbers, and a type of "2" could represent credit card numbers. The second column lists the numerical identifiers. The third column lists any optional uniqueness suffix. The fourth column contains a pointer to the registered user's record. Note that a registered user can have multiple numerical identifiers in the database. Therefore, the same record number can be associated with different numerical identifiers.

Figure 4B:
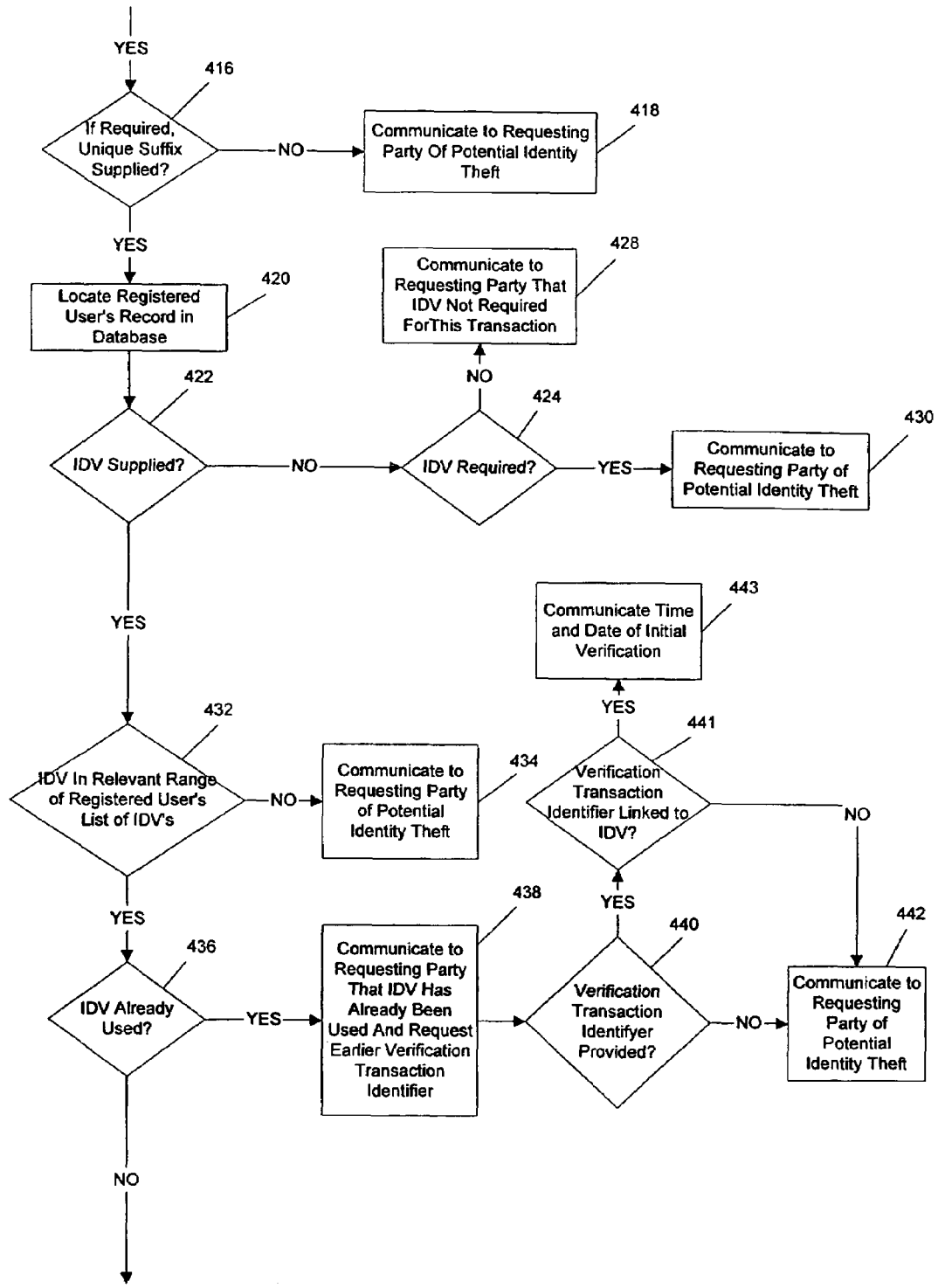
Figure 4C:
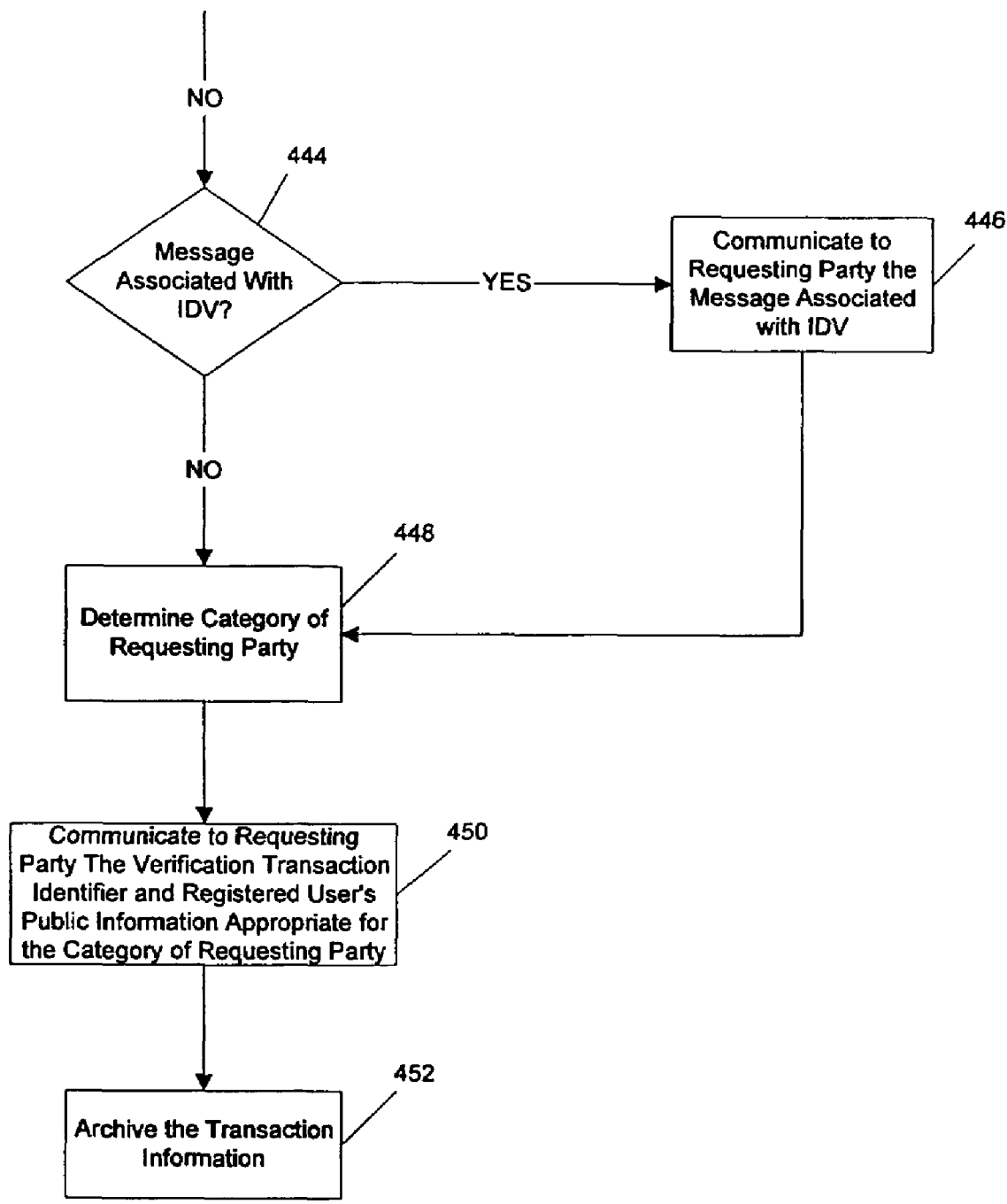

Returning to the operations of FIGS. 4*a*–*c*, once the idv list is linked to the registered user's record, the system is ready to be utilized in a transaction. The registered user armed with its list of idv's (obtained from the system in operation 409) initiates a transaction by providing the requesting party with a numerical identifier and an unused idv from the registered user's list of idv's. The requesting parry then submits the numerical identifier and the idv to the identity verification system of this invention. As discussed earlier, the submission of the numerical identifier and the idv to the system can be done in many different ways including but not limited to by telephone, over the Internet, or via an electronic remote terminal similar to a credit card reader.

Receiving information operation 410 involves obtaining information from the requesting party. The information received should include at least one numerical identifier. Any numerical identifier registered with the system may be used. The information received may also include an idv and other information. The operation 410 can be performed by receipt of a phone call and obtaining the numerical identifier via voice communications. Alternatively, the operation 410 can be accomplished by electronic transfer of the information over a communications network such as a WAN or LAN.

Determining operation 412 involves comparing the numerical identifier received in operation 410 with a general list of numerical identifiers of all registered users to see if the received numerical identifier is present on the general list. In a preferred embodiment, the general list is stored in the database 210 as a table such as illustrated in FIG. 7.

If the result of the determining operation 412 is that the numerical identifier received in operation 410 is not present in the database, then operation flows to communication operation 414. Communication operation 414 sends a message to the requesting party indicating that the party attempting to be identified in the transaction is not registered.

If the result of the determining operation 412 is positive, that is, the numerical identifier is in the database, then operation flows to the suffix determining operation 416. Suffix determining operation 416 performs a review of the general list of numerical identifiers (such as the exemplary list shown in FIG. 7) to ascertain whether the numerical identifier received requires a uniqueness suffix. If a uniqueness suffix is required, then the suffix determining operation 416 determines whether a suffix has been received.

If a uniqueness suffix is required and one was not provided, then the operation flows to communication operation 418. Communication operation 418 sends a message to the requesting party indicating that an identity crime is potentially being attempted.

If a uniqueness suffix is not required or is correctly received, then operation flows to locating record operation 420. Locating record operation 420 identifies the registered user's record based on the numerical identifier (and if required the uniqueness suffix).

Determining operation 422 reviews the information received in receiving information operation 410 and searches for an idv. If an idv is not received, then operation flows to determining operation 424.

Determining operation 424 reviews the registered user's record to determine whether the particular transaction being considered is on the list of transactions that require an idv. An example of such a list was discussed above in reference to FIG. 9. If an idv is required, then communication operation 430 sends a message to the requesting party indicating that an idv is required and that an identity crime is potentially being attempted. If an idv is not required for the type of transaction being entered into, then the communications operation 428 sends a message to the requesting party indicating that an idv is not required for this particular transaction.

If an idv was received in receiving operation 410, then operation flows from operation 422 to determining operation 432. Determining operation 432 compares the received idv with the list of idv's in the registered user's record to determine whether the received idv is within the relevant range of the registered user's list of idv's. In other words, the determining operation 432 searches idv's only within the relevant range. Implementation of the comparison may be accelerated by prior creation of a second sorted copy of the list of idv's with pointers to the location of each idv in the original list.

If the idv received is not within the relevant range of the registered user's idv's, that is, if the idv received matches none of the idv's in the relevant range of the registered user's list of idv's, then communication operation 434 sends a message to the requesting party indicating that an identity crime is potentially being committed.

If the idv received is within the relevant range of the registered user's idv's, that is, if the idv received matches one of the idv's in the relevant range of the registered user's list of idv's, then determining operation 436 compares the received idv with a list of idv's already used to determine whether the received idv has been used before.

As discussed above, idv character strings may be repeated as long as the repeat occurs outside a "relevant range". Therefore, the search in operation 436 of previously used idv's should search only within the relevant range of the idv list.

If the received idv has been used before, then communications operation 438 sends a message to the requesting party indicating that the submitted idv has been used before. There are two main possible reasons that an idv would have been used before. First, the second attempt to use the idv could be an identity fraud attempt. Second, the type of transaction being performed might have two legitimate requesting parties. For example, in a payment by check type of transaction, the registered user may write out a check to a retailer and provide an idv to the retailer. The retailer submits the idv to the identity verification system and obtains verification of the registered user's identity (and receives a verification transaction identifier). The retailer then attempts to cash the check at a bank. The bank may submit the idv to the identity verification system. This submission would be a second use of the idv, but it would not be an attempted identity crime. The flow operations 438, 440, 441, 442 and 443 distinguish between these two possible reasons for multiple idv use. Communications operation 438 requests submission of an earlier verification transaction identifier. Communications operation 438 may receive an earlier verification transaction identifier from the requesting party in response to the request.

Determining operation 440 determines whether a verification transaction identifier is provided. If no verification transaction identifier is provided, then communicating operation 442 sends a message to the requesting party indicating that an identity crime is potentially being attempted.

Determining operation 441 compares the verification transaction identifier received in operation 438 with the verification transaction identifier linked to the already used idv. If the two verification transaction identifiers are the same, then communication operation 443 sends a message to the requesting party that the transaction has already been verified and provides the time and date of the initial verification as well as any other necessary information. If the comparison performed by determining operation 441 is negative, that is, the verification transaction identifiers are not the same, then operation flows to communications operation 442.

Returning to determining operation 436, if the idv has not been used before (within the relevant range), then operation flows to determining operation 444.

As discussed above, it is often desired to associate some information or message with an idv to provide another level of fraud protection. Determining operation 444 reviews the registered user's record to determine whether the received idv is associated with a message. In the example record provided in FIG. 10, the associated message is provided in the 5th column of the table.

If a message is associated with the idv, then communicating operation 446 sends the message associated with the idv to the requesting parry. At this point the requesting party can compare the message received from the system to the information received by the party providing the idv. If the message received from the system is not the same as the information from the party providing the idv, then the requesting party can reasonably determine that fraud is being attempted and can therefore terminate the transaction.

Determining category operation 448 reviews information from the requesting party (received in the receiving operation 410) and ascertains the category of the requesting party. This determining operation allows the system to eventually release only the pre-authorized information in the registered user's record to the requesting party.

Communicating operation 450 sends the verification transaction identifier associated with the idv to the requesting party. The requesting party may wish to save all verification transaction identifiers to prove that it verified the user's identity should the question be raised later by law enforcement or insurance investigators.

Communicating operation 450 also provides any pre-authorized information to the requesting party as is appropriate for the determined category of the requesting party as might be set forth in a record such as shown in FIG. 6. For example, if the requesting party is a bar, and the registered user pre-authorized the category of bars to receive only age information, then only age information is provided to the requesting party.

Archiving operation 452 stores the information from the transaction such as the numerical identifier and all associated record information. This storage of information can be done in the database or on tapes or by other means. Archiving operation 452 results in the ability to audit and prove past transactions.

Although the invention has been described in language specific to computer structural features, methodological acts and by computer readable media, it is to be understood that the invention defined in the appended claims is not necessarily limited to the specific structures, acts or media described. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

I claim:

1. A method of obstructing identity crimes, the method comprising:
    obtaining at a verification system a list of at least two identity verifiers, each identity verifier to be used for no more than one transaction;
    linking at the verification system the list of identity verifiers to at least one numerical identifier associated with a registered user, the registered user selected from the group consisting of persons and entities;
    providing the list of identity verifiers from the verification system to the registered user;
    enabling the registered user to provide security messages to the verification system to be associated with the identity verifiers, each security message pertaining to an intended transaction;
    receiving at the verification system a numerical identifier from a requesting party, the requesting party having obtained the numerical identifier from a transaction initiator claiming to be associated with the numerical identifier;
    receiving at the verification system an identity verifier from the requesting party, the requesting party having obtained the identity verifier from the transaction initiator claiming to be associated with the numerical identifier;
    determining at the verification system whether the received identity verifier is within the list of identity verifiers linked to the received numerical identifier;
    communicating information from the verification system to the requesting party indicating whether the received identity verifier is within the list of identity verifiers linked to the received numerical identifier; and
    sending from the verification system to the requesting party any security message associated with the received identity verifier to enable the requesting party to compare the security message with a transaction being conducted by the transaction initiator.

2. The method of claim 1 wherein the communicating information step signals that the received identity verifier has not been used before and is within the list of identity verifiers linked to the received numerical identifier by sending a verification transaction identifier to the requesting party.

3. The method of claim 1 further comprising:
    (a) determining whether the identity verifier received from the requesting party has been used before; and
    (b) communicating information to the requesting party signaling whether the identity verifier has been used before.

4. The method of claim 2 further comprising archiving the identity verifier and the verification transaction identifier.

5. The method of claim 1 further comprising:
    (a) storing public information about the registered user;
    (b) creating at least two categories of requesting parties;
    (c) receiving instructions from the registered user regarding what public information is allowed to be released to each of the at least two categories of requesting party;
    (d) determining the category of the requesting party;
    (e) communicating the appropriate public information to the requesting party pursuant to the instructions from the registered user.

6. The method of claim 1 wherein the at least one numerical identifier is a social security number.

7. The method of claim 1 wherein the at least one numerical identifier is a drivers license number.

8. The method of claim 1 wherein the at least one numerical identifier is a bank account number.

9. The method of claim 1 wherein the at least one numerical identifier is a phone number.

10. The method of claim 1 wherein the at least one numerical identifier is a credit card number.

11. The method of claim 1 further comprising receiving a uniqueness suffix and wherein determining whether the received identity verifier is within the list of identity verifiers linked to the received numerical identifier further comprises determining whether the received identity verifier is within the list of identity verifiers linked to the received numerical identifier and the received uniqueness suffix.

12. The method of claim 1 wherein receiving a numerical identifier, receiving an identity verifier and communicating information to the requesting party are performed by voice communications over a phone line.

13. The method of claim 1 wherein receiving a numerical identifier, receiving an identity verifier and communicating information to the requesting party are performed through electronic communication through a wide area network.

14. A method of determining whether an identity verifier is required to be submitted in a particular transaction, the method comprising:
    (a) obtaining a list of at least two identity verifiers, each identity verifier to be used for no more than one transaction;
    (b) linking the list of identity verifiers to at least one unique numerical identifier wherein the numerical identifier is associated with a registered user selected from a group consisting of persons and entities;
    (c) creating categories of transactions;
    (d) receiving instructions from the registered user designating the categories of transactions that require an identity verifier and designating the categories of transactions that do not require an identity verifier;
    (e) receiving a numerical identifier from a requesting party, the requesting party having obtained the numerical identifier from a transaction initiator claiming to be associated with the numerical identifier;
    (f) receiving information from the requesting party specifying the type of transaction occurring;
    (g) determining whether the transaction requires the use of an identity verifier; and
    (h) communicating information to the requesting party wherein the information communicated indicates whether an identity verifier is required for the specified transaction.

15. A method of obstructing identity crimes, the method comprising:
    associating a plurality of identity verifiers with a registered user, each of the identity verifiers to be used for a single transaction;

receiving from the registered user at least one security message, each security message corresponding to one of the plurality of identity verifiers;

associating each security message provided by the registered user to the corresponding identity verifier;

receiving one of the plurality of identity verifiers from a requesting party, the requesting party having received the one identity verifier from a transaction initiator;

determining whether the one identity verifier received from the requesting party is associated with a corresponding security message; and transmitting to the requesting party any corresponding security message associated with the one identity verifier received from the requesting party to allow the requesting party to view the corresponding security message provided by the registered user.

16. The method of claim 15, wherein transmitting the security message associated with the received identity verifier includes enabling the requesting party to compare the message pertaining to the transaction with a transaction initiated by the transaction initiator.

17. A method of protecting numerical identifiers associated with registered users, the method comprising:

obtaining at least one registered user;

obtaining a list for each registered user, each list including at least one numerical identifier, each numerical identifier included in the list associated with the registered user;

obtaining at least two identity verifiers for each registered user, each identity verifier to be used in only one transaction;

associating each of the at least two identity verifiers with the corresponding registered user; and transmitting to each registered user the at least two identity verifiers associated with the registered user, each of the identity verifiers enabling the registered user to verify to a requesting party via a verification system any numerical identifier selected from the list, and each of the identity verifiers capable of verifying the selected numerical identifier.

18. The method of claim 17, wherein at least one numerical identifier in at least one of the lists includes a unique suffix enabling the numerical identifier to be associated uniquely with the registered user, wherein removing the unique suffix from the numerical identifier would yield a shared numerical identifier.

19. The method of claim 17, wherein the numerical identifier is selected from the group consisting of social security numbers, bank account numbers, credit card numbers, drivers license numbers, phone numbers, and Internet addresses.

20. The method of claim 17, further comprising:

determining a numerical identifier type for each numerical identifier on the list; and associating each numerical identifier on the list with the respective numerical identifier type.

21. A system for protecting numerical identifiers of registered users, the system comprising:

an input device configured to obtain a corresponding list for each of a plurality of registered users, each list including at least one numerical identifier, the input device being further configured to obtain at least two identity verifiers for each of the plurality of registered users;

a database configured to associate each of the plurality of registered users with the corresponding list of the at least one numerical identifier, the database being further configured to associate each of the at least two identity verifiers with the corresponding registered user; and a communications device configured to transmit to each registered user the at least two identity verifiers associated with the registered user, each of the identity verifiers enabling the registered user to verify to requesting parties any numerical identifier selected from the list by the registered user, and each of the identity verifiers being capable of verifying the selected numerical identifier in any one transaction.

22. A verification system configured to obstruct identity crimes, the verification system comprising:

an input device configured to obtain a list of at least two identity verifiers to be associated with a registered user, the registered user selected from the group consisting of persons and entities, each identity verifier to be used for no more than one transaction, the input device further configured to enable the registered user to provide a security message to be associated with one of the identity verifiers, the security message indicating information pertaining to an intended transaction;

a database configured to link the list of identity verifiers to at least one numerical identifier associated with the registered user, the database further configured to link a security message to one of the identity verifiers if the registered user has provided such a security message;

a communication device configured to receive a numerical identifier and an identity verifier from a requesting party, the requesting party having obtained the numerical identifier and the identity verifier from a transaction initiator claiming to be associated with the numerical identifier, the communication device further configured to transmit to the requesting party information indicating whether the received identity verifier is within the list of identity verifiers linked to the received numerical identifier and whether a security message has been associated with the received identity verifier; and a processing device configured to determine whether the received identity verifier is within the list of identity verifiers linked in the database to the received numerical identifier, the processing device further configured to determine whether the received identity verifier is associated with a security message.

* * * * *

UNITED STATES PATENT AND TRADEMARK OFFICE
CERTIFICATE OF CORRECTION

PATENT NO. : 7,240,363 B1
APPLICATION NO. : 09/679916
DATED : July 3, 2007
INVENTOR(S) : Ellingson Page 1 of 1

It is certified that error appears in the above-identified patent and that said Letters Patent is hereby corrected as shown below:

Title page, (76) Inventor: "R.R. 1 Box 69, Sisseton, SD (US) 57262" should read --915 E. Walnut Street, Sisseton, SD 57262--

Title page 2, Other Publications, Kroenke, D. et al. reference: "*Database Processing and Fundamentals, Design, Implementation,*" should read --*Database Processing: Fundamentals, Design, Implementation,*--

Col. 9, line 12: "updated from fine to time" should read --updated from time to time--

Col. 9, line 43: "six may be stored" should read --suffix may be stored--

Col. 12, line 19: "parry then submits" should read --party then submits--

Col. 14, line 32: "requesting parry." should read --requesting party.--

Signed and Sealed this

Tenth Day of June, 2008

JON W. DUDAS
*Director of the United States Patent and Trademark Office*